United States Patent
Roosli

(10) Patent No.: US 11,496,159 B2
(45) Date of Patent: Nov. 8, 2022

(54) MESH-NETWORK MULTIMODE SYSTEM WITH A SOFTWARE DEFINABLE RADIO

(71) Applicant: Honeywell International Inc., Morris Plains, NJ (US)

(72) Inventor: Philipp Anton Roosli, Niantic, CT (US)

(73) Assignee: Honeywell International Inc., Charlotte, NC (US)

( * ) Notice: Subject to any disclaimer, the term of this patent is extended or adjusted under 35 U.S.C. 154(b) by 185 days.

(21) Appl. No.: 16/890,299

(22) Filed: Jun. 2, 2020

(65) Prior Publication Data

US 2021/0376864 A1 Dec. 2, 2021

(51) Int. Cl.
| | | |
|---|---|---|
| *H04W 4/00* | (2018.01) | |
| *H04B 1/00* | (2006.01) | |
| *H04W 76/14* | (2018.01) | |
| *H04W 84/18* | (2009.01) | |
| *H04W 4/33* | (2018.01) | |
| *H04W 92/16* | (2009.01) | |
| *H04W 88/06* | (2009.01) | |
| *H04W 92/04* | (2009.01) | |

(52) U.S. Cl.
CPC ............ *H04B 1/0003* (2013.01); *H04W 4/33* (2018.02); *H04W 76/14* (2018.02); *H04W 84/18* (2013.01); *H04W 88/06* (2013.01); *H04W 92/04* (2013.01); *H04W 92/16* (2013.01)

(58) Field of Classification Search
None
See application file for complete search history.

(56) References Cited

U.S. PATENT DOCUMENTS

| | | | |
|---|---|---|---|
| 7,940,749 B2 | 5/2011 | Lu et al. | |
| 9,826,529 B1* | 11/2017 | Jorgovanovic | H04W 72/1236 |
| 2010/0115528 A1 | 5/2010 | Pipponen et al. | |
| 2016/0157050 A1* | 6/2016 | He | H04W 76/10 |
| | | | 455/41.2 |
| 2016/0165380 A1* | 6/2016 | Kwan | H04W 4/80 |
| | | | 455/41.1 |
| 2018/0084596 A1* | 3/2018 | Schwengler | H04W 88/16 |

(Continued)

FOREIGN PATENT DOCUMENTS

CN 101697640 B 5/2015

OTHER PUBLICATIONS

Shruthi et al., "A QPSK Modulated Software Defined Radio Receiver Using TDM for Multiple Channel Reception," IEEE, 5 pages, 2012.

*Primary Examiner* — Bob A Phunkulh
(74) *Attorney, Agent, or Firm* — Seager, Tufte & Wickhem LLP

(57) ABSTRACT

A communication system that may be used in room and building automation. A mesh network may be associated with a room of a building, or the like. Connectivity may be provided for devices with servers and a cloud in one mode. Connectivity may be provided for devices to mobile devices and a room-level information module in another mode. These modes of connectivities of various modes may be effected with a software definable radio or radios. Other modes of connectivity may be implemented. Examples of modes may incorporate Bluetooth low energy (BLE) and non-BLE formats. The modes may be multiplexed to operate one at a time and be switched back and forth as needed.

17 Claims, 2 Drawing Sheets

(56) References Cited

U.S. PATENT DOCUMENTS

| | | | |
|---|---|---|---|
| 2018/0343567 A1* | 11/2018 | Ashrafi | H04L 41/0816 |
| 2019/0268906 A1* | 8/2019 | Perdomo | G01S 19/13 |
| 2021/0099976 A1* | 4/2021 | Mueck | H04W 72/04 |
| 2021/0185485 A1* | 6/2021 | Deixler | H04W 4/80 |
| 2021/0248087 A1* | 8/2021 | Pan | G06F 12/123 |

* cited by examiner

MESH-NETWORK MULTIMODE SYSTEM WITH A SOFTWARE DEFINABLE RADIO

BACKGROUND

The present disclosure relates to RF mesh networks, in particular to networks used in building automation.

SUMMARY

The disclosure reveals a communication system that may be used in building automation. A mesh network may be associated with a room of a building, or the like. Connectivity may be provided for devices with servers and a cloud in one mode. In another mode, connectivity may be provided for mobile devices and a room-level information module. These connectivities of various modes may be effected with a software definable radio (SDR) or radios. Other modes of connectivity may be implemented. Examples of modes may incorporate Bluetooth low energy (BLE) and non-BLE formats. The modes may be multiplexed to operate one at a time and be switched back and forth as needed.

DESCRIPTION

Figure 1:
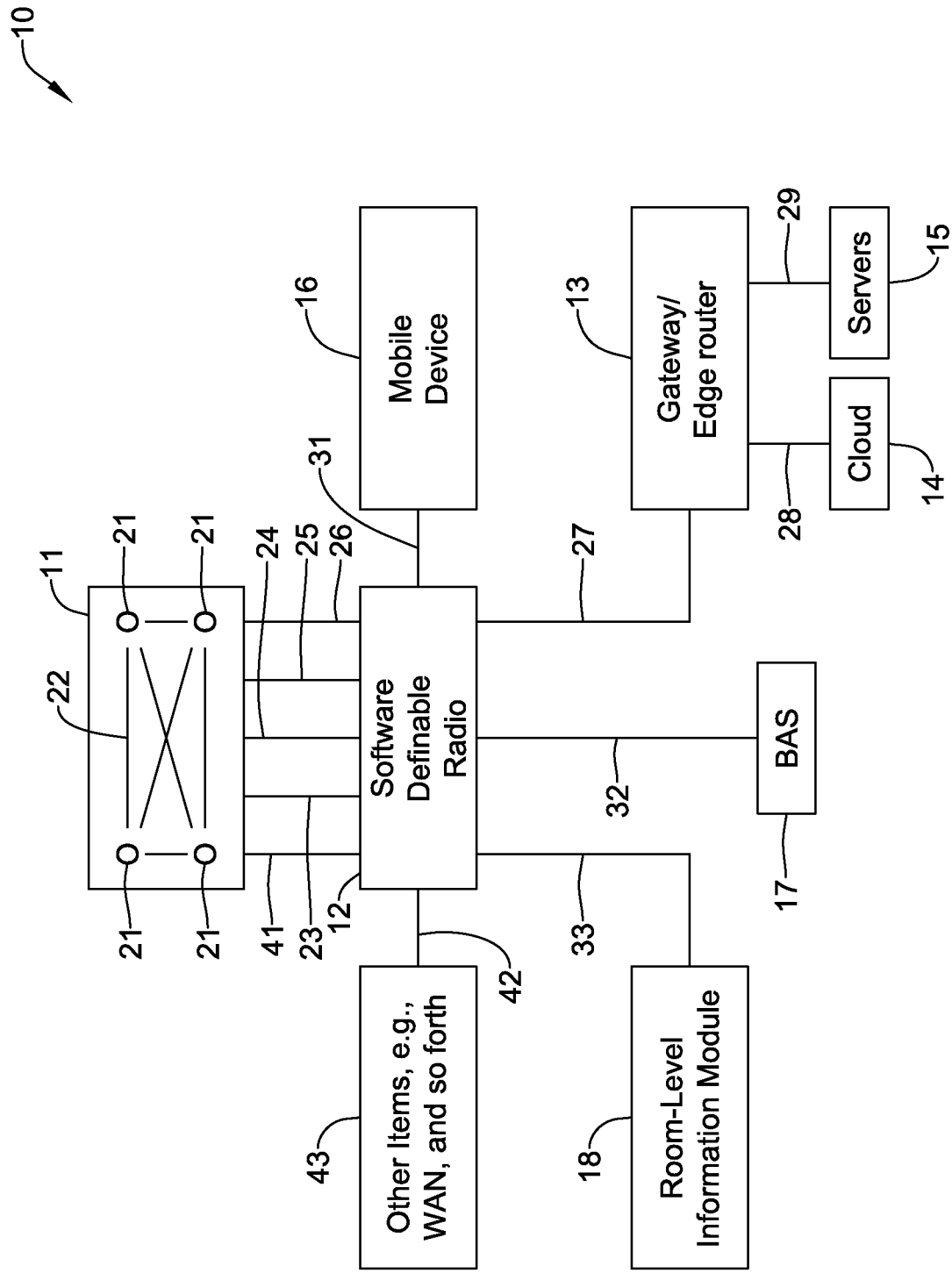
FIG. 1 is a diagram of a basic layout of the present multimode system.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

The present disclosure may relate to RF mesh networks, in particular to networks used in building automation, and further in particular when used in room automation such as when applied to hotel guestrooms or offices. Networks of the described kind may have typically fundamental uses: 1) to provide the connectivity between devices that pertain to a finite and defined space of a building (e.g., room, office); and 2) to provide an overarching connectivity of devices with servers and a cloud via an edge router or gateway device.

The networks may be based on IEEE 802.15.4 (hereafter 802.15.4), Wi-Fi (IEEE 802.11), or Bluetooth. Such application may be further augmented with additional secondary RF links that allow a portable or mobile device, e.g., a tablet or mobile phone, to interact at a room level within the system.

The challenge with the above setup is that the system may have devices that need to support both applications of linking the room devices and a wide-area network together, plus an interface to the mobile device. If one assumes that the mobile device link uses BLE, it may be difficult to operate a secondary network, such as IEEE 802.15.4 or some other normal approach, in a receive/transmit mode at close proximity due to near-field effects. When one of the two radios transmits, it may be difficult to receive at full sensitivity data at the other radio. One may be forced to assign time slots for each mode of operation, but this may lead to a reduction of available bandwidth for each application. Further, if the radio is operated to service the mobile device, the device may not necessarily concurrently receive updates that might be essential for the mobile device.

Because the present system may have multiplexing of the radio modes, it does not necessarily have the drawback of bandwidth reduction on the mesh network side, and the mobile device link does not necessarily go out of synch with the room-level mesh network.

Using a software definable radio, one may create a time-multiplexed (duty cycled) communication scheme where the radio is switched back-and-forth between the 802.15.4 mode and the BLE mode. The 802.15.4 radio may be used to communicate with all the elements of a building automation system and with gateways that route traffic into the cloud. The BLE mode may be used to communicate with the mobile device of an end user. The BLE sessions may be intermittent and the system can keep the BLE mode times very low until an active session is established. This means that a node that supports both modes or radios may normally spend most of their time in the non-BLE mode.

Each room may have a slotted time pattern with two discrete modes (mode A=normal, mode B=BLE). During mode B, all devices may withhold traffic that transports information that is part of the room status exchange. This may assure that the BLE application will not miss any of the room-level information packets. This, for example, may include changes to the HVAC modes, lighting levels, occupancy status, and so on.

During mode B, all devices that do not operate a BLE radio may be using their 802.15.4 radio to route mesh traffic that is not related to in-room status updates, such as routing packets to or from the gateway device. This traffic is not necessarily needed for the BLE application and the single node that operates in a BLE mode does not necessarily impair the mesh network since a typical mesh network has sufficient redundancy in that a single temporary missing node would not have a detrimental effect. This arrangement may assure that the mesh network does not lose overall bandwidth since it uses all available time for at least some available traffic that can be routed.

During non-BLE modes (e.g., mode A), devices may exchange both in-room traffic and gateway bound traffic.

The BLE mode timing may be room specific (randomized among multiple rooms) to avoid system aliasing effects (i.e., too many BLE nodes weakening the mesh network) and to improve performance in the face of the hidden-node syndrome.

The device that operates the BLE mode may keep the session very short in cases where there is no available mobile device or the mobile device session is not active. Mode B timing may be reserved but the BLE node can use the residual time of mode B for mesh traffic if there is no need to spend the entire allotted time in the BLE mode.

A chip set to assist in the present function may be a Texas Instruments Incorporated CC2650 chip. The CC2650 chip may be a wireless MCU targeting Bluetooth, ZigBee and 6LoWPAN, and ZigBee RF4CE remote control applications. Herein in the present system, this chip may switch back-and-forth between BLE and 802.15.4 modes. The chip may need only a layout for a single antenna as the two radio modes could operate in the same frequency band.

FIG. 1 is a diagram of the present system 10. Mesh network 11 may be connected to a definable software radio 12. Mesh network 11 may have a plurality of nodes and/or devices 21 connected to one another. Mesh network 11 may be at a room or office level of a building such as a hotel. Devices 21 may pertain to the room or office that may be referred as a finite and defined space of the building. Connections 23, 24, 25, and 26 from mesh network 11 to radio 12 may be of several modes or frequencies. A mode A may be normal, or a transmission or reception at a non-BLE frequency or bandwidth or power (e.g., IEEE 802.15.4). A mode B may be a BLE frequency, bandwidth, or power.

Radio 12 may be software defined as an interface for signals on connections 23, 24, 25, and 26. These connections may be wireless, but one or more could be wired connections. The signals may be in mode A or mode B, or some other mode. Connections 23, 24, 25, and 26 may provide signals to, or receive signals from, radio 12 and mesh network 11. Connection 23 may convey a signal in mode A to or from radio 12, which may operate as an interface for the signal. After processing or conditioning, if performed, the signal may go to gateway/edge router 13 via a connection 27. From gateway/edge router 13, the signal may go to a cloud 14 and/or servers 15 via connection 28 and/or connection 29, respectively. Signals may come from cloud 14 or servers 15 via connection 28 or 29, respectively, and go via gateway/edge router 13, connection 27, radio 12, and connection 23 to network 11.

A connection 24 may convey a signal in mode B to or from software definable radio 12, which may operate as an interface or an RF secondary link for the signal to or from a mobile device 16 via a connection 31. A connection 25 may convey a signal in mode A to or from radio 12, which may be an interface for the signal. After processing or conditioning, if performed, the signal may go to a building automation system (BAS) 17 via a connection. Signals may be provided by BAS 17 via connection 32, radio 12, and connection 25 to network 11.

A connection 26 may convey a signal in mode B from network 11 to radio 12, which may be an interface for the signal. After processing or conditioning, if performed, the signal may go from radio 12 to a room-level information module 18. Signals may be provided by module 18 via connection 33, radio 12, and connection 26 to network 11. Information module 18 may incorporate HVAC mode changes, lighting levels, occupancy status, and so forth.

Another connection 41 may be mesh network 11 and radio 12 with each other. Signals from mesh network 11 may go via radio 12 to one or more items such as a wide area network (WAN) in block 43. Signals may go from block 43 via connection 42 to mesh network 11 via radio 12.

Figure 2:
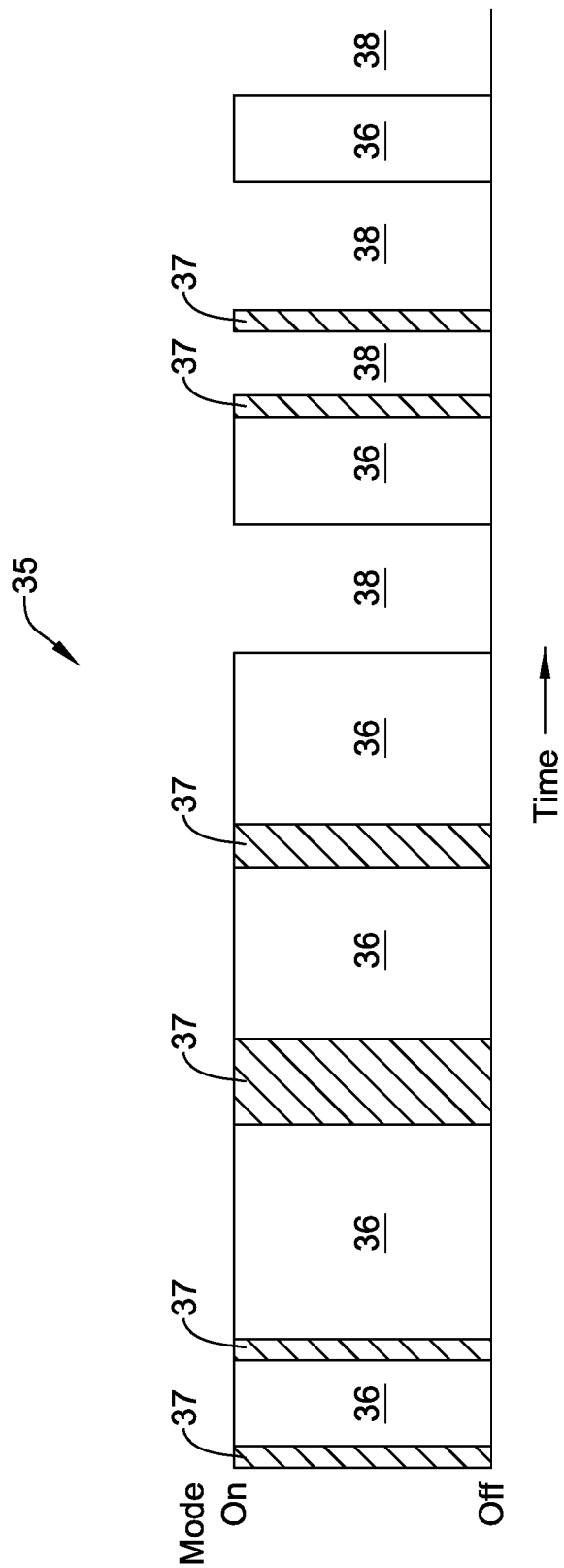
FIG. 2 is a diagram of a time multiplexed graph for several modes.

FIG. 2 is a diagram of a time multiplexed communication scheme 35 created by use of software definable radio 12, where radio 12 may be switched back and forth between the mode A and mode B. The diagram may be an "on or off" indication versus time. Mode A may be represented by blocks 36. Mode B may be represented by blocks 37. An absence of any mode being active may be represented by spaces 38. Additional modes may be incorporated in the multiplexing scheme.

IEEE standard 802.15.4 may offer the fundamental lower network layers of a type of wireless personal area network (WPAN) which focuses on low-cost, low-speed ubiquitous communication between devices. It may be contrasted with other approaches, such as Wi-Fi, which may offer more bandwidth and need more power. The present emphasis may be on very low cost communication of nearby devices with little to no underlying infrastructure, intending to exploit lower power consumption even more.

IEEE standard 802.11 may be a set of media access control (MAC) and physical layer (PHY) specifications for implementing wireless local area network (WLAN) computer communication in, for example, the 900 MHz and 2.4, 3.6, 5, and 60 GHz frequency bands.

To recap, a network connection system may incorporate a multimode software definable radio, a mesh network that provides connectivity between devices which pertain to a finite and defined space of a building, a mobile device, and a gateway connectable to a cloud. The mesh network may have a first mode of connectivity with a mobile device via the multimode software definable radio. The mesh network may have a second mode of connectivity with the gateway via the multimode software definable radio, and with elements of a building automation system.

The first mode of connectivity and second mode of connectivity may be the same or different from each other.

The first mode of connectivity may be in accordance with a Bluetooth low energy format. The second mode of connectivity may be in accordance with a non-Bluetooth low energy format.

The finite and defined space of a building may be a room or office of a building.

The multimode software definable radio may switch back-and-forth between the first mode of connectivity and second mode of connectivity, with one mode operating at a time.

Timing of a mode of connectivity may be room specific to avoid nodes of the mode of connectivity from weakening the mesh network.

During the first mode of connectivity, devices may withhold traffic that transports information that is part of a status exchange for the room or office.

An approach of connectivity for a mesh network may incorporate connecting a room-level RF mesh network via a software definable radio to a gateway and a mobile device. The software definable radio may provide a connection of the mesh network to the gateway with a first wireless mode. The software definable radio may provide a connection of the mesh network to the mobile device with a second wireless mode.

The first wireless mode may be in a format of Bluetooth low energy. The second wireless mode may be in a format of non-Bluetooth low energy.

The software definable radio may switch back-and-forth between the first wireless mode and the second wireless mode.

The approach may further incorporate connecting the gateway to a cloud.

The approach may further incorporate connecting the gateway to one or more servers.

The mobile device may be held in synch with the mesh network via the software definable radio.

The approach may further incorporate connecting the mesh network to a WAN via the software definable radio.

The approach may further incorporate connecting the mesh network via the software definable radio to a building automation system.

The connecting the mesh network to the building automation system may use the second wireless mode.

The software definable radio may spend more time in the second wireless mode than time in the first wireless mode.

A mesh network arrangement may incorporate a mesh network in a room of a building, a software definable radio having a wireless connection to the mesh network, a mobile device having a wireless connection to the software definable radio, a gateway connected to the software definable radio and connectable to a cloud. A wireless connection with the software definable radio may be of one mode selected from a plurality of modes for RF transmission and reception.

The plurality of modes may incorporate a first mode and a second mode. The first mode may be based on IEEE 802.15.4. The second mode is based on Bluetooth low energy.

The gateway may have a second mode of connectivity with the cloud.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A network connection system comprising:
a multimode software definable radio having a time-multiplexed communication scheme specific to a finite and defined space of a building having a plurality of finite defined spaces, the time-multiplexed communication scheme is configured to switch between a first mode of connectivity and a second mode of connectivity according to a slotted time pattern specific to the finite and defined space;
a mesh network that provides connectivity between devices that pertain to the finite and defined space;
a mobile device; and
a gateway connectable to a cloud; and
wherein:
the mesh network uses the first mode of connectivity to connect with the mobile device via the multimode software definable radio, the first mode of connectivity is in accordance with a Bluetooth low energy format;
the mesh network uses the second mode of connectivity to connect with the gateway and elements of a building automation system via the multimode software definable radio, the second mode of connectivity is in accordance with a non-Bluetooth low energy format.

2. The network connection system of claim 1, wherein the first mode of connectivity and second mode of connectivity are the same or different from each other.

3. The network connection system of claim 1, wherein the second mode of connectivity is in accordance with a 802.15.4 format.

4. The network connection system of claim 1, wherein the finite and defined space of a building is a room or office of a building.

5. The network connection system of claim 1, wherein during the first mode of connectivity, devices withhold traffic that transports information that is part of a status exchange for the room or office.

6. A method of connectivity for a mesh network comprising:
connecting a room-level RF mesh network via a software definable radio to a gateway and a mobile device, the room-level RF mesh network is configured for a room of a building having a plurality of rooms; and
wherein:
the software definable radio has a time-multiplexed communication scheme specific to the room, the time-multiplexed communication scheme is configured to switch between a first wireless mode and a second wireless mode according to a slotted time pattern specific to the room;
the software definable radio provides a connection of the mesh network to the gateway with the first wireless mode according to the time-multiplexed communication scheme, the first wireless mode is in a format of non-Bluetooth low energy; and
the software definable radio provides a connection of the mesh network to the mobile device with the second wireless mode according to the time-multiplexed communication scheme, the second wireless mode is in a format of Bluetooth low energy.

7. The method of claim 6, wherein the first wireless mode is in a format of 802.15.4.

8. The method of claim 6, further comprising connecting the gateway to a cloud.

9. The method of claim 6, further comprising connecting the gateway to one or more servers.

10. The method of claim 6, wherein the mobile device is held in synch with the mesh network via the software definable radio.

11. The method of claim 6, further comprising connecting the mesh network to a WAN via the software definable radio.

12. The method of claim 6, further comprising connecting the mesh network via the software definable radio to a building automation system.

13. The method of claim 12, wherein the connecting the mesh network to the building automation system uses the first wireless mode.

14. The method of claim 13, wherein the software definable radio spends more time in the first wireless mode than time in the first wireless mode.

15. A mesh network arrangement comprising:
a mesh network in a room of a building having a plurality of rooms, the mesh network is configured for the room;
a software definable radio having a wireless connection to the mesh network, the software definable radio having a time-multiplexed communication scheme specific to the room and the time-multiplexed communication scheme is configured to switch modes of a plurality of modes for transmission and reception according to a slotted time pattern specific to the room;
a mobile device having a wireless connection to the software definable radio;
a gateway connected to the software definable radio and connectable to a cloud; and
wherein a wireless connection with the software definable radio is of one mode selected from the plurality of modes for RF transmission and reception; and
wherein the plurality of modes include a Bluetooth low energy mode of connectivity and a non-Bluetooth low energy mode of connectivity.

16. The mesh network arrangement of claim 15, wherein the plurality of modes comprises:
a first mode; and
a second mode; and
wherein:
the first mode is based on IEEE 802.15.4; and
the second mode is based on Bluetooth low energy.

17. The mesh network arrangement of claim 16, wherein the gateway has a second mode of connectivity with the cloud.

* * * * *